(12) United States Patent
Reilly et al.

(10) Patent No.: US 6,467,755 B2
(45) Date of Patent: Oct. 22, 2002

(54) POWER DRIVEN WINCH WINDING TOOL

(75) Inventors: Thomas J. Reilly, Fort Myers; Phillip D. Ruck, Buckingham; James C. Ruck, Sarasota, all of FL (US)

(73) Assignee: Winch Winder Company, Fort Myers, FL (US)

( * ) Notice: Subject to any disclaimer, the term of this patent is extended or adjusted under 35 U.S.C. 154(b) by 21 days.

(21) Appl. No.: 09/773,035

(22) Filed: Jan. 31, 2001

(65) Prior Publication Data

US 2001/0045550 A1 Nov. 29, 2001

Related U.S. Application Data

(60) Provisional application No. 60/179,656, filed on Feb. 2, 2000.

(51) Int. Cl.$^7$ ............................................... B21F 9/00
(52) U.S. Cl. ..................... 254/223; 410/100; 410/103
(58) Field of Search ........................... 254/199, 222, 254/223, 247, 376; 410/12, 96, 100, 103, 156

(56) References Cited

U.S. PATENT DOCUMENTS

| | | | | |
|---|---|---|---|---|
| 3,428,331 A | * | 2/1969 | Morgan et al. | 410/100 |
| 4,913,608 A | * | 4/1990 | Royball | 254/218 |
| 5,156,506 A | * | 10/1992 | Bailey | 24/68 CD |
| 5,524,870 A | * | 6/1996 | Tallent et al. | 254/323 |
| 5,603,489 A | * | 2/1997 | Regal | 254/342 |
| 5,607,143 A | * | 3/1997 | Regal | 254/342 |
| 6,019,551 A | * | 2/2000 | Stephenson | 408/138 |
| 6,102,637 A | * | 8/2000 | Mocci | 410/100 |
| 6,135,685 A | * | 10/2000 | Anthony et al. | 280/414.1 |
| 6,139,233 A | * | 10/2000 | Wilsey | 410/100 |
| 6,250,607 B1 | * | 6/2001 | Strom | 254/342 |
| 6,350,088 B1 | * | 2/2002 | Priester | 410/100 |

* cited by examiner

Primary Examiner—Emmanuel M. Marcelo
(74) Attorney, Agent, or Firm—William E. Noonan

(57) ABSTRACT

A power driven tool is provided for winding a strap or other flexible component onto a winch. The tool is inserted into the axial opening of the winch spindle and includes a longitudinal slot that receives the inner end of the strap. The tool also includes a head portion that is lockably interengagable with a drive component of a rotary power apparatus. The rotary power apparatus is interengaged with the tool and rotatably driven such that the tool turns the spindle to wind the strap thereon.

8 Claims, 5 Drawing Sheets

POWER DRIVEN WINCH WINDING TOOL

RELATED APPLICATION

This application claims the benefit of U.S. Provisional Patent Application Serial No. 60/179,656 filed Feb. 2, 2000.

FIELD OF THE INVENTION

This invention relates to a tool or adapter that permits a winch to be wound quickly and conveniently using a conventional rotary power tool.

BACKGROUND OF THE INVENTION

Flat bed trucks and other industrial and commercial vehicles often employ one or more straps for securing the load to be hauled in the bed of the vehicle. Typically, each strap is wound on a standard winch mechanism mounted to the bottom or side of the vehicle bed. The winch employs a ratchet and a cam that is selectively disengaged from the ratchet so that the strap may be pulled across and engaged with the load. When the desired length of strap is deployed, the cam is re-engaged with the ratchet to prevent the strap from further unwinding. After the vehicle has completed its trip, the strap is disengaged from the load and wound back onto the winch. The cam and the ratchet are configured so that the cam rides over the ratchet while the strap is being re-wound.

Rewinding the loading strap onto the winch is typically a very tedious and time consuming task. The worker manually grasps and turns the end of the spindle that projects axially from the side of the winch opposite the ratchet. For winches used in standard industrial flat bed trucks, approximately 40 turns of the spindle are required to fully wind the strap back onto the winch. This effort is compounded considerably because most trucks employ a pair of winch mounted fastening straps. When a number of vehicles are involved in a delivery, the manpower required to rewind all of the straps can be considerable. This not only adds time and expense to a job, it can be extremely wearisome for the driver or other worker to perform the rewinding.

SUMMARY OF THE INVENTION

It is therefore an object of this invention to provide a tool that permits a winch and winch mounted strap to be rewound quickly and conveniently with virtually little or no effort.

It is a further object of this invention to provide a tool that permits the fastening or loading straps on an industrial vehicle to be rewound with a standard rotary power tool such as an electric or pneumatic wrench or drill.

It is a further object of this invention to provide a tool that permits a winch to be rewound using much less manpower, time and effort then has heretofore been required.

It is a further object of this invention to provide a tool for rewinding a winch that is much less tedious and time consuming for workers to use and which allows the winch to be rewound much more efficiently.

It is a further object of this invention to provide a tool for rewinding a winch that may be driven by a wide variety of power tools including power wrenches and drills.

It is a further object of this invention to provide a tool for rewinding a winch that is extremely simple to install and operate.

This invention features a power driven tool or adapter for winding a standard winch. The winch for which this tool is used includes a yoke and a generally tubular spindle mounted rotatably in the yoke. The spindle includes a central opening and pair of generally opposed apertures formed radially in the circumferential surface of the spindle. An elongate strap or other flexible component is wound on the spindle. An inner portion of the strap or other flexible component extends through the generally opposed apertures of the spindle and across the central opening. At least one end of the spindle is open such that the central opening of the spindle is exposed. The tool of this invention includes an elongate body portion connected to and extending from a head portion. The body portion includes a slot formed longitudinally therein. The head portion carries means for lockably and releasably interengaging a standard rotary driven power apparatus such as an electric or pneumatic wrench or drill. The elongate body of the adapter tool is introduced into the central opening of the winch spindle such that the longitudinal slot of the body portion receives the inner portion of the flexible component extending across the central opening. The rotary driven power tool is operated to axially rotate the elongate body. The body engages the inner portion of the flexible element, which drives the spindle rotatably. As a result, the flexible component is wound onto the spindle.

In a preferred embodiment, the elongate body has a generally tubular shape. The longitudinal slot in the body portion may include a generally parallel pair of slotted portions that communicate with an axial opening formed through the body portion. The means for lockably and releasably interengaging may include a driver receptacle formed in the head portion. The driver receptacle may communicate with the axial opening formed to the body portion. The driver receptacle preferably has a square shape. Typically, a complementary shaped driver component (e.g. a square drive) is attached to and driven rotatably by the rotary driven power apparatus. The drive component is inserted into and thereby lockably interengaged with the driver receptacle in the head portion of the winch winding tool. When the power driver is operated, the drive component rotates the head portion and thereby axially rotates the elongate body portion of the adapter tool. This causes the engaged flexible component and spindle to be wound as previously described.

In alternative embodiments a different type of lockable interengagement may be employed. For example, the head portion may carry a square or other shaped driver and a socket may be interengaged with that component and driven by the rotary driven power apparatus.

BRIEF DESCRIPTION OF THE DRAWINGS

Other objects, features and advantages will occur from the following description of a preferred embodiment and the accompanying drawings, in which.

Figure 1:
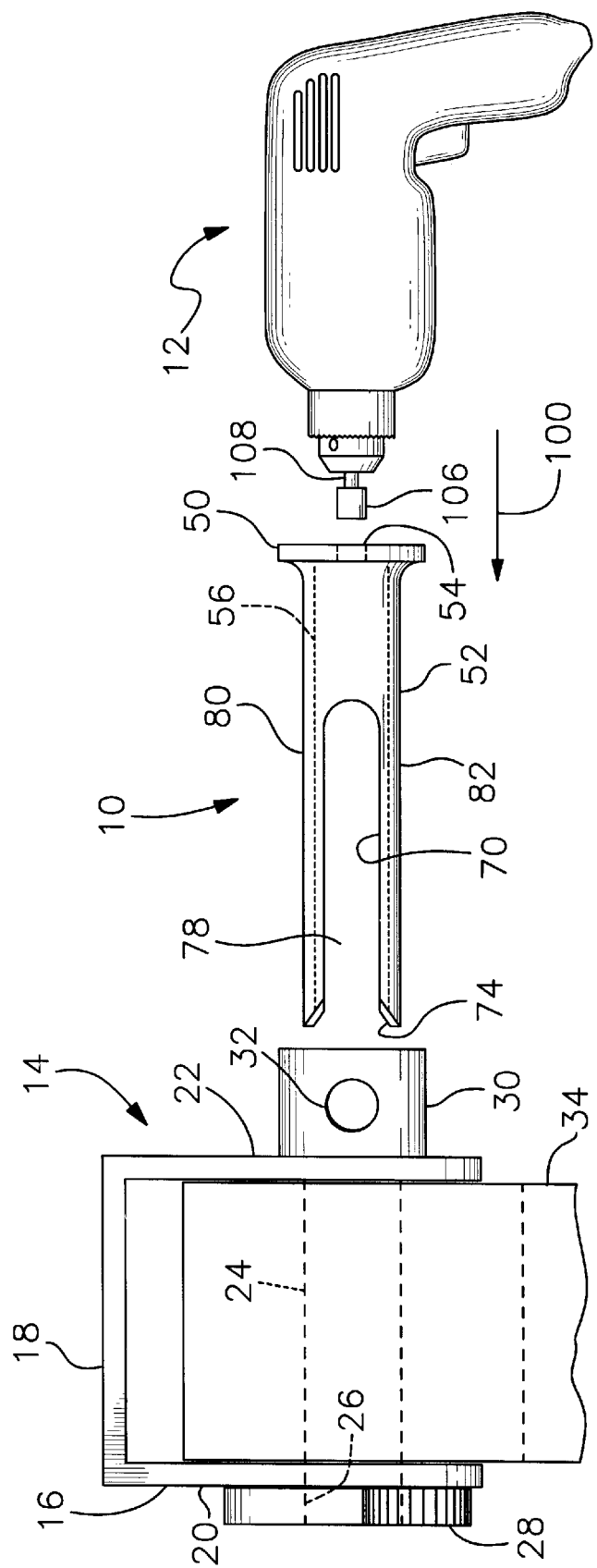
FIG. 1 is an elevational, exploded view of the power driven winch winding tool of this invention located between the rotary driven power apparatus used to drive the tool and the winch that is wound using the tool.

There is shown in FIG. 1 a power driven winch winding tool 10 that is selectively and releasably engagable with rotary driven power apparatus 12. The tool is driven by apparatus 12 to quickly and conveniently rewind a standard winch mechanism 14. The winch mechanism is mounted in a conventional manner to the side or bottom of a flat bed truck, not shown. It should be understood that the tool of this invention may be used with a wide variety of alternative types of winches.

Figure 2:
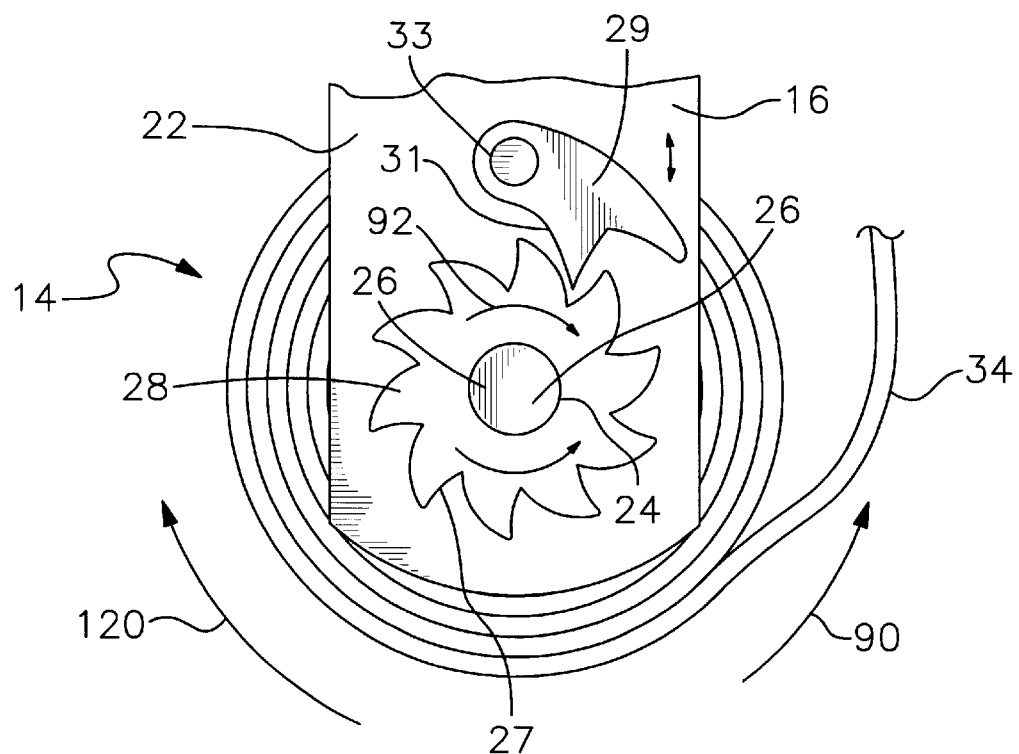
FIG. 2 is an elevational side view of a standard truck mounted winch that is driven by the tool of this invention; the ratchet and cam of the winch are specifically exhibited.

As shown in FIGS. 1 and 2, winch 14 includes a metal mounting bracket or yoke 16 that has a generally inverted U-shaped configuration. The bracket includes an upper surface 18 that is welded, bolted or otherwise fixed to the underside of the vehicle bed. A pair of generally parallel ears or lobes 20 and 22 depend from portion 18. A spindle 24 is rotatably mounted to and extends between depending ears 20 and 22. The spindle projects outwardly somewhat from each side of the winch. A projection portion 26 extends outwardly from ear 20. An annular ratchet 28 is fixed to projection portion 26 and is rotatable with spindle 24 relative to bracket 16. A standard cam 29 having a locking finger 31 is pivotably mounted to ear 20 above ratchet 28 by a rivet or other type of pivot means 33. Ratchet 28 has a plurality of circumferential teeth 27.

Figure 3:
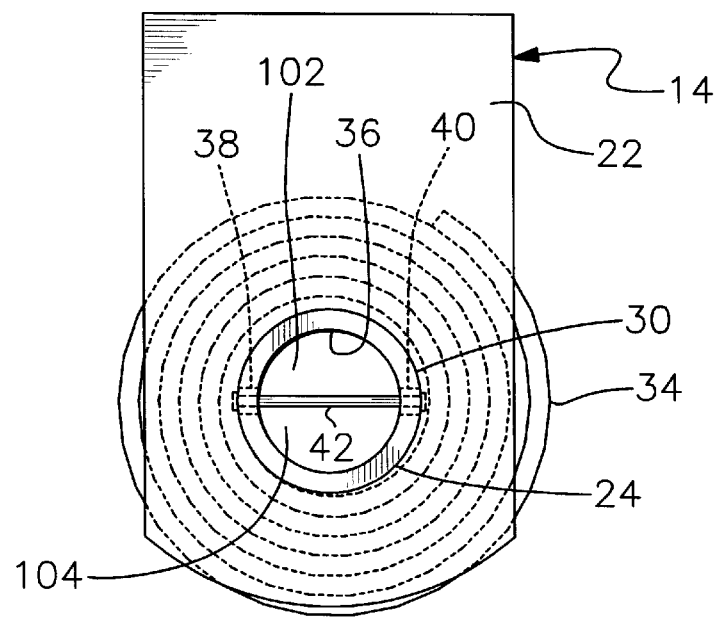
FIG. 3 is an elevational view of the winch viewed from the side opposite the side shown in FIG. 2; the interior of the spindle and the inner portion of the flexible strap are specifically exhibited.
Figure 4:
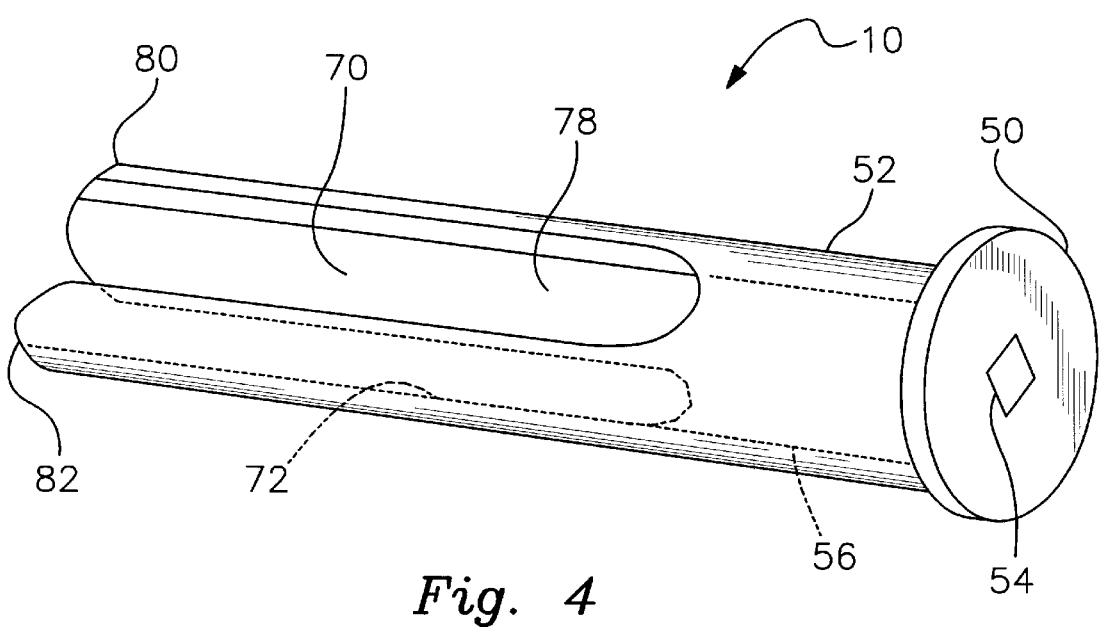
FIG. 4 is a perspective view of the power driven winch winding tool.
Figure 4C:
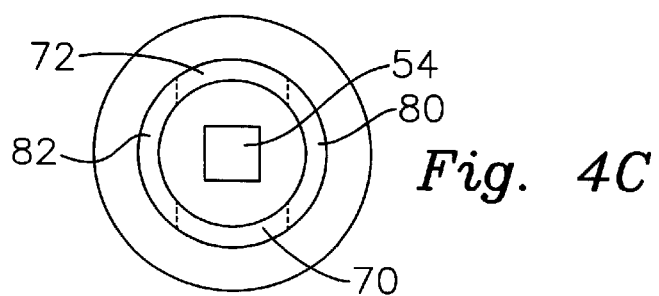
FIGS. 4A–4D are side, front, top and bottom elevational views, respectively, of the winding tool.
Figure 4A:
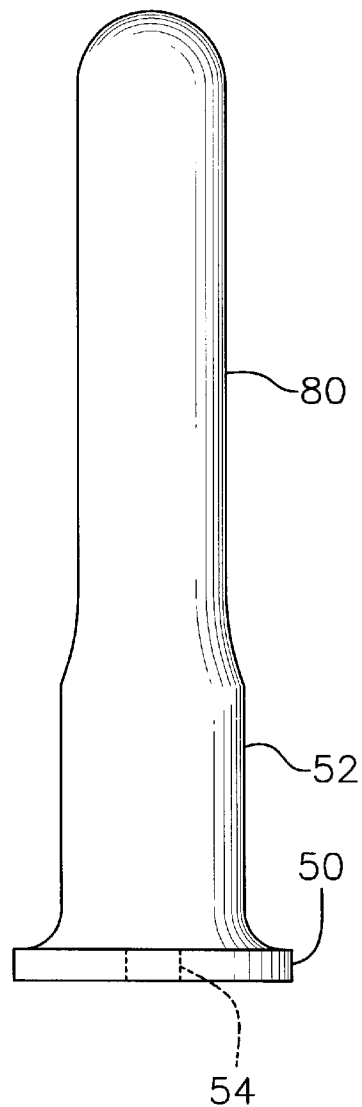
Figure 4B:
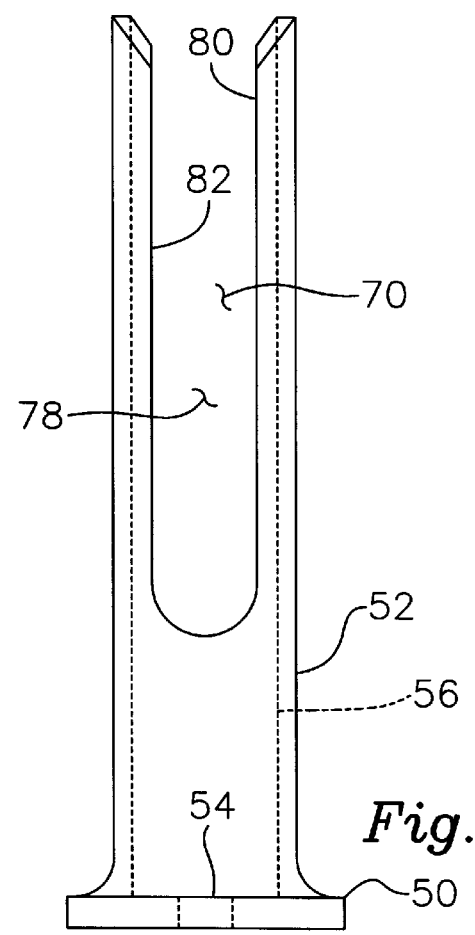
Figure 4D:
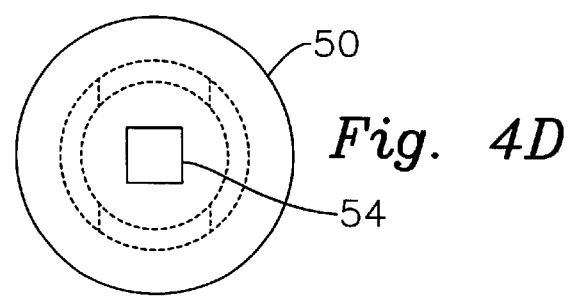

A second projection portion 30 extends outwardly from depending ear 22. Projection portion 30 has a cylindrical shape and is open at its distal end, as best depicted in FIG. 3. As illustrated in FIG. 1, one or more radial holes 32 are formed through cylindrical projection portion 30. These radial holes receive a bar or rod that is turned to tightened the winch, when required, in a manner that is more fully described below.

An elongate flexible strap 34 is wound about spindle 24 in a conventional manner. More particularly, as shown in FIG. 3, spindle 24 includes a central opening 36 that extends longitudinally through the spindle. Opening 36 is exposed through the open distal end of projection portion 30. A pair of generally radial slots or apertures 38 and 40 are formed in spindle 24 between ears 20 and 22. Slots 38 and 40 are diametrically aligned and opposed to one another. An inner portion 42 of strap 34 extends through aligned openings 38 and 40 and across central opening 36 of spindle 30. The inner end of the strap overlaps a portion of the circumference of spindle 30. The strap extends from that inner end through the aligned apertures. The strap is then wound continuously about the spindle such that the inner end of the strap is, in effect, secured to the spindle by the winds of the strap itself. The outer layers of the strap effectively fasten the inner end of the strap to the spindle. In order to disengage the strap from the spindle, the strap must be fully unwound therefrom and pulled through openings 38 and 40.

The length of strap 34 may be varied within the scope of this invention. Typically, in embodiments that are employed on flat bed trucks, a sufficient length of strap must be provided to properly engage a load typically carried by the truck. Appropriate types of hooks, clamps, etc. (not shown) are carried by the distal end of strap 34. These components are engaged with the truck and/or load carried by the truck in a standard manner. In alternative embodiments, the invention may be utilized with various other types of winches that carry cable, cords and other assorted types of elongate flexible elements.

Winding tool 10, which is shown alone in FIGS. 4, 4A–4D, comprises a one piece component manufactured of steel or some other durable metal, metal alloy or plastic. Tool 10 includes a generally circular or disk shaped head portion 50 and an elongate body portion 52 that is unitarily connected to head portion 50. As shown in FIGS. 1 and 3, head portion 40 includes a square or rectangular driver receptacle 54 formed therein. Body portion 52 has a generally tubular shape. A central or axial opening 56 is formed through the body portion. Opening 56 is generally aligned with and communicably interengages receptacle 54 and head portion 50. A pair of longitudinal slotted segments 70 and 72 extend along body portion 52 from the distal end 74 of the winding tool. Slotted segments 70 and 72 are generally parallel to one another. As a result, the slotted segments and the axial opening of the body portion effectively form an elongate slot 78, best shown in FIG. 1. This slot is essentially divides the body portion into a pair of elongate fingers 80 and 82.

Strap 34 is deployed from winch 14 to secure a load carried by the truck in the following manner. Cam 29 is pivoted upwardly to disengage locking element 31 from teeth 27 of ratchet 28. This permits spindle 24 to rotate freely. As a result, the operator can pull strap 34 in the direction of arrow 90 to unwind the strap from the winch. The strap is unwound in this fashion until a needed length of strap is deployed. The strap is then engaged with the truck or the load in a standard manner. The operator allows cam 29 to pivot downwardly into interengagement with teeth 27 of ratchet 28. This prevents the strap from unwinding further. To tighten or cinch the strap, the operator introduces a bar or handle, not shown, into one or more of the radial openings 32 (FIG. 1) in spindle projection portion 30. With the distal end of strap 34 still hooked onto or otherwise engaged with the truck bed or the load, the operator rotates the bar so that the spindle turns clockwise as indicated by arrow 92 in FIG. 2. Cam locking element 31 slides over the teeth 27 in a ratchet like fashion and strap 34 is tightened.

Figure 5:
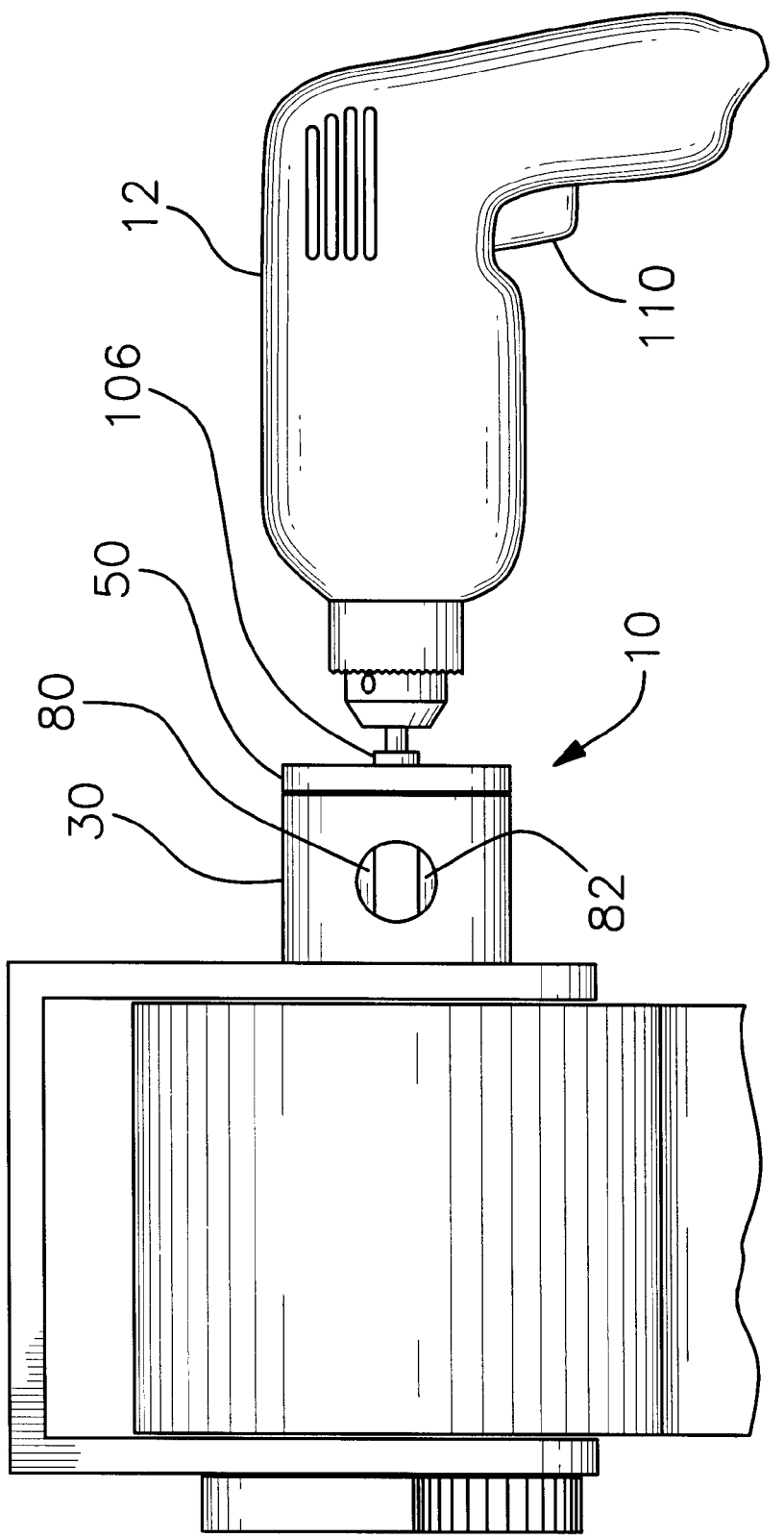
FIG. 5 is an elevational side view of the winch being wound using the power driven winch winding tool of this invention.

When delivery of the load is completed, the strap is disengaged from the load in a known manner. The strap may then be re-wound onto the spindle of winch 14 by using rotary power apparatus 12 and winding tool 10. The operator grasps tool 10 and aligns the body portion 52 of the tool with the axial opening 36 of spindle 24. Such alignment is best shown in FIG. 1. The winding tool is then inserted into the central opening of the spindle in the direction of arrow 100. As the body portion is pushed into the spindle, the longitudinal slot 78 in the body portion receives or interengages inner strap portion 42 (FIG. 3). Tool 10 is pushed longitudinally through central opening 36 of spindle 24 until head portion 50 engages the distal outer end of spindle projection portion 30 in the manner shown in FIG. 5. The diameter of head portion 50 should be at least as great as the diameter of spindle portion 30 so that the spindle projection limits the degree to which tool 10 may be inserted into the spindle. A generally flush interengagement is achieved between the head portion and the spindle projection. When the body portion is fully inserted into the spindle and the slot 78 receives inner strap portion 42, the fingers 80 and 82 of body portion 50 are disposed on respective sides of the inner strap portion 42 (i.e. within respective compartments 102 and 104 of axial opening 36, shown in FIG. 3).

After tool 10 is interengaged in the above described manner with spindle 24 and strap 34, rotary power apparatus 12 is operably interengaged with the winding tool. More particularly, rotary apparatus 12 comprises a power drill or wrench. This apparatus may be electrically or pneumatically operated. The particular form of rotary apparatus that is used is not a limitation of the invention. In the version shown herein, a square drive component 106 is releasably and operably mounted to the drive shaft 108 of apparatus 12. Component 106, FIGS. 1 and 5, has a square shape that conforms to the shape of receptacle 54 formed in head portion 50 of tool 10. The drive component should have a slightly smaller dimension such that receptacle 54 receives component 106 in a snug, generally mating fashion. The rotary power apparatus 12 is interengaged with tool 10 by inserting component 106 into receptacle 54. It should be noted that in alternative embodiments, the head portion of tool 10 may carry a square, rectangular or other shape drive component and a complementary shape drive socket or analogous element may be releasably attached to the rotary power apparatus. In such versions, interengagement between the power apparatus and the winding tool is accomplished by inserting the lug or projection carried by the tool into the receptacle or drive socket of the power apparatus. It should also be noted that the drive or lug used to interconnect the winding tool and the power tool may carry an appropriate spring loaded detent or bearing which helps to releasably retain the winding tool on the rotary power apparatus. Various alternative means may be used for releasably locking the winding tool onto the power apparatus.

In either event, after the winding tool is engaged with the spindle and strap and the power apparatus is engaged with the winding tool, the power apparatus is operated to rewind the strap onto the spindle. Apparatus 12 should be set so that winding tool 10 is driven in the appropriate or required direction. As shown in the drawings, the power apparatus and the tool are assembled in the manner shown in FIG. 5. Trigger 110 of apparatus 12 is then actuated. This rotatably drives component 106, which in turn axially rotates tool 10. The fingers 80 and 82 of tool 10 grasp strap portion 42 extending through slot 78 and thereby cause spindle 24 to turn in the direction of arrow 92 (FIG. 2). Locking element 31 of cam 29 rides over the sloped teeth 27 and strap 34 is wound quickly and conveniently onto the spindle in the direction arrow 120. The entire rewinding process is accomplished in seconds by simply maintaining the pressure on trigger 110 of power apparatus 12. Rewinding is therefore achieved in a quick, convenient and virtually effortless fashion. Multiple straps can be rewound in a similar manner so that even greater efficiency is achieved.

It should be noted that in alternative embodiments, the winding tool may first be attached to the rotary power apparatus and then inserted into the spindle for operation. After the winding operation is completed, the winding tool is removed from the spindle by simply pulling the rotary power apparatus and winding tool together from the winch. The winding tool may then be disengaged from the rotary power apparatus by pulling tool 10 off of drive 106.

From the foregoing it may be seen that the apparatus of this invention provides for a tool or adapter that permits a winch to be wound quickly and conveniently using a conventional power tool. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. An adapter tool that is operably engagable with a rotary driven power apparatus for winding a winch, which winch includes a yoke and a generally tubular spindle mounted rotatably in the yoke, the spindle including a central opening, the winch also including an elongate strap, an inner portion of which is attached to the spindle and extends across the opening thereof, at least one end of the spindle being open such that the central opening of the spindle is exposed, said adapter tool comprising:

a head portion carrying means that are releasably and lockably interengagable with the rotary driven power apparatus; and an elongate body portion connected to and extending from said head portion for axially rotating in response to operation of the rotary driven power apparatus, said elongate body being introducable into the central opening of the winch spindle and having a slot formed longitudinally therein for receiving the portion of the flexible strap extending across the central opening, said elongate body portion being axially rotatable by the rotary power apparatus for engaging the inner portion of the flexible strap and driving the spindle axially rotatably such that the strap is windable onto the spindle.

2. The tool of claim 1 in which said elongate body portion has a generally tubular shape.

3. The apparatus of claim 2 in which said means for lockably and releasably interengaging include a receptacle formed in said head portion for receiving and interengaging said rotary driven power tool, said receptacle communicating with said axial opening in said body portion.

4. The apparatus of claim 1 in which said longitudinal slot and said body portion includes a generally parallel pair of slotted sections that communicate with an axial opening formed through said body portion.

5. The apparatus of claim 1 in which said means for lockably and releasably interengaging include a receptacle formed in the head portion for receiving and operably interengaging the rotary driven power tool.

6. The apparatus of claim 5 in which said receptacle has a square shape.

7. The tool of claim 1 in which the head portion is unitarily connected to said elongate body.

8. The tool of claim 1 in which said head portion and said body portion are axially rotatable in response to operation of the rotary power apparatus when the apparatus is operably attached to said tool.

* * * * *